United States Patent
Villani

(10) Patent No.: US 12,524,813 B1
(45) Date of Patent: *Jan. 13, 2026

(54) CHAT TOOL FOR FINANCIAL PLANNING AND ANALYSIS FUNCTIONS

(71) Applicant: Villani Analytics, LLC., Scarsdale, NY (US)

(72) Inventor: Daniel A. Villani, Scarsdale, NY (US)

(73) Assignee: Villani Analytics, LLC.

( * ) Notice: Subject to any disclaimer, the term of this patent is extended or adjusted under 35 U.S.C. 154(b) by 0 days.

This patent is subject to a terminal disclaimer.

(21) Appl. No.: 19/026,706

(22) Filed: Jan. 17, 2025

Related U.S. Application Data

(63) Continuation of application No. 18/810,525, filed on Aug. 21, 2024.

(51) Int. Cl.

| | |
|---|---|
| *G06Q 40/06* | (2012.01) |
| *G06F 16/22* | (2019.01) |
| *G06F 40/35* | (2020.01) |
| G06F 40/18 | (2020.01) |
| G06F 40/186 | (2020.01) |

(52) U.S. Cl.
CPC ......... *G06Q 40/06* (2013.01); *G06F 16/2264* (2019.01); *G06F 40/35* (2020.01); *G06F 40/18* (2020.01); *G06F 40/186* (2020.01)

(58) Field of Classification Search
None
See application file for complete search history.

(56) References Cited

U.S. PATENT DOCUMENTS

| | | | |
|---|---|---|---|
| 11,954,112 B2 | 4/2024 | Siebel et al. | |
| 12,039,612 B1 * | 7/2024 | Zumpano | G06Q 40/08 |

(Continued)

FOREIGN PATENT DOCUMENTS

| | | |
|---|---|---|
| AU | 2022396273 A1 | 5/2024 |
| WO | 2024091682 A1 | 5/2024 |

OTHER PUBLICATIONS

Hall, "Zenlytic develops commerce-specific, self-serve business intelligence tool", TechCrunch, Nov. 14, 2022, TechCrunch Media LLC, US, https://techcrunch.com/2022/11/14/zenlytic-commerce-business-intelligence/, 9 pages.

(Continued)

*Primary Examiner* — Thu N Nguyen
(74) *Attorney, Agent, or Firm* — Gearhart Law LLC

(57) ABSTRACT

The disclosure improves the efficiency and accuracy of Financial Planning & Analysis functions within large companies. This improvement is facilitated via a chatbot tool, which functions against financial systems in an organization. Key tool components include a chat interface, a presentation component, a visualization component, a forecast component, and an AI component. The AI component provides AI capabilities to the other components (chat, presentation, visualization, and forecast). Behind the scenes, the tool provides data reconciliation functions, which permits information to be gathered from multiple sources, which are reconciled to each other. Data sources include various types of databases relational and non-relational ones, as well as data cube structures. The query functions permit natural language queries and other queries through a chatbot or chat-like interface.

20 Claims, 12 Drawing Sheets

(56) References Cited

U.S. PATENT DOCUMENTS

| | | | |
|---|---|---|---|
| 2020/0233857 A1 | 7/2020 | Fehling et al. | |
| 2021/0286950 A1* | 9/2021 | Quamar | G06F 40/295 |
| 2023/0342392 A1 | 10/2023 | Mccarson | |
| 2024/0184777 A1 | 6/2024 | Rahmfeld et al. | |
| 2024/0184781 A1 | 6/2024 | Conrad et al. | |
| 2025/0086204 A1* | 3/2025 | Lowe | G06F 16/22 |

OTHER PUBLICATIONS

Rebello et al., "Machine Learning-Based Dynamic Modeling for Process Engineering Applications: A Guideline for Simulation and Prediction from Perceptron to Deep Learning", Processes, Feb. 2022, pp. 250, vol. 10, No. 2, MDPI, Switzerland, https://doi.org/10.3390/pr10020250, 18 pages.

Zheng et al., "FinBrain: When Finance Meets AI 2.0", arXiv, Aug. 26, 2018, 11 pages, arXiv:1808.08497 [cs.AI], Cornell University, USA, https://arxiv.org/abs/1808.08497.

"Data and Analytics Insights", Convolut, Munich, Germany, https://www.convolut.eu/category/data-and-analytics-insights, 6 pages.

Nguyen, "Reconciling Schema Matching Networks", Thèse No. 6033, presented Jan. 14, 2014, École Polytechnique Fédérale de Lausanne (EPFL), Faculty of Computer and Communication Sciences, Distributed Information Systems Laboratory, Lausanne, Switzerland, 2013. https://core.ac.uk/download/pdf/148001301.pdf, 162 pages.

Mckay et al., "The Intelligent Database Interface: Integrating AI and Database Systems", Proceedings of the Eighth National Conference on Artificial Intelligence (AAAI-90), 1990, pp. 677-684, AAAI Press, Boston, MA, USA, https://cdn.aaai.org/AAAI/1990/AAAI90-102.pdf.

"Investing Automated: The Power of AI in Robo-Advising", Yieldstreet Blog, 2024, Yieldstreet, San Francisco, USA, https://www.yieldstreet.com/blog/article/ai-robo-advisors/, 10 pages.

Yang et al., "FinRobot: An Open-Source AI Agent Platform for Financial Applications using Large Language Models", arXiv, May 2024, arXiv:2405.14767 [cs.AI], AI4Finance Foundation, https://arxiv.org/pdf/2405.14767, 16 pages.

"text2sql.ai, Text to SQL & AI Query Generator", Text2SQL.ai, 2025, https://www.text2sql.ai, 15 pages.

"Intelligent Analytics Platform: Ask data questions to Zoë", your AI data coworker, Zenlytic, New York, USA, 2024, https://www.zenlytic.com, 13 pages.

"AI-Generated Dashboards & Data Visualization", Polymer Search, 2025, Munich, Germany, https://www.polymersearch.com/ai-dashboard-generator, 14 pages.

"Explo AI—Generative & AI-Powered Analytics", Explo Inc., San Francisco, CA, USA, 2025, https://www.explo.co/products/explo-ai, 4 pages.

"Watsonx BI—AI-Powered Business Intelligence Platform", IBM, Spring 2024, Armonk, NY, USA, https://www.ibm.com/products/watsonx-bi, 7 pages.

Non U.S. Appl. No. 18/810,525, filed Aug. 21, 2024, Title: "Chat Tool for Financial Planning & Analysis Functions", Inventor: Daniel A. Villani.

\* cited by examiner

Analytics Chat

New conversation
0 messages

Database table
schema and
contents
3 messages

Chat     Present     Visualize     Forecast

How can I help you today?

Here are your results:

| CategoryName | TotalSales |
|---|---|
| Beverages | 8,310,426.00 |
| Condiments | 5,051,886.88 |
| Confections | 6,092,657.42 |
| Dairy Products | 5,225,892.95 |
| Grains/Cereals | 2,561,295.42 |
| Meat/Poultry | 5,897,979.28 |
| Produce | 2,936,024.33 |
| Seafood | 4,492,510.08 | what were my sales in 2016 by category?

Prompt Input

➤ SEND

⚙ SETTINGS

FIG. 2A

Here are your results:

| CategoryName | TotalSales |
|---|---|
| Beverages | 8,310,426.00 |
| Condiments | 5,051,886.88 |
| Confections | 6,092,657.42 |
| Dairy Products | 5,225,892.95 |
| Grains/Cereals | 2,561,295.42 |
| Meat/Poultry | 5,897,979.2 |
| Produce | 2,936,024.3 |
| Seafood | 4,492,510.0 |

Show Query

Create CSV
Create XLSX
Create GoogleSheet

Create Presentation
Create Visualization

FIG. 2C

CHAT TOOL FOR FINANCIAL PLANNING AND ANALYSIS FUNCTIONS

CROSS-REFERENCE TO RELATED APPLICATIONS

This Application is a Continuation of U.S. Non-Provisional Utility patent application Ser. No. 18/810,525 filed Aug. 21, 2024, the entire contents of which are incorporated by reference in its entirety.

FIELD OF THE EMBODIMENTS

The field of the invention and its embodiments relate to intra-company financial planning and analysis functions, artificial intelligence, chat bots, presentation builders, dashboards, and more specifically, to a chat-like tool for intracompany financial planning and analysis functions. In embodiments, this can be considered a system and a method for an AI dashboard and/or for a presentation builder.

BACKGROUND OF THE EMBODIMENTS

Artificial Intelligence (AI) is currently being utilized to automate routine tasks in financial analysis, ratio analysis, and reporting, significantly reducing the time required for these activities. AI can be integrated into existing financial systems like Enterprise resource planning (ERP) and Customer Relationship Management (CRM) to enhance financial planning, analysis, and decision-making processes. In fact, many companies have already started implementing intelligent solutions such as advanced analytics, process automation, robo-advisors, and self-learning programs.

In simple terms, AI provides some amazing and emerging tools, which by consensus will be utilized in the future across organizations for a myriad of tasks. However, the general concept of garbage-in-garbage-out (GIGO) applies. AI is all too often being viewed as a "hammer" that automatically converts everything else into a nail. Integration of AI analysis is conventionally thought of as an analysis alternative, one that can be used to replace human driven analysis.

Instead, a different focus/approach should be taken, where AI and/or other automated tools are expressly designed for use by human analysists. That is, what is needed is an AI and/or a suite of automated tools that assists human analysis within a company to perform their financial planning and analysis functions. Such a tool would ideally gather, reconcile, aggregate, and present (e.g., prefilter/sort) information from a variety of diverse sources and to facilitate the creation of human analysts' reports. This approaches places responsibility, justifiability, and accountability in the hands of the human analysts (and not an unaccountable AI), while enhancing and deepening the level of analysis taken for intra-company financial planning and analysis tasks.

This disclosure is not to be confused with robo-advisors, stock pickers, and the like, which focus on external financial analysis and providing the same to novices as a substitute for human analysis.

RELATED ART

WO2024091682A1 discloses an intelligent system that reconciles relational database management systems (RDBMs), which includes artificial intelligence (AI) functions for front-end and back-end interfaces. This disclosure does not mention direct query generation against relational and multidimensional databases such as ORACLE EPM, ONESTREAM and other systems. The patent deals with training prediction models and does not deal with natural language creation of POWERPOINT slides or DASHBOARDS.

U.S. Pat. No. 11,954,112B2 is titled "Systems and Methods for Data Processing and Enterprise AI Applications." This disclosure provides AI based ways of handling and reconciling different data types in divergent formats.

US20240184781A1 discloses generating reports from one or more databases that store disparate datasets. Specifically, the proposed systems enable the intelligent generation of reports from multiple datasets by automatically determining a proposed set of join configurations for combination of the multiple datasets. This disclosure focuses upon automating reporting from relational databases.

U.S. Pat. No. 12,007,980B2 discloses an automated method of categorizing spend data is provided that does not require a prior in-depth knowledge of an organization's transactional data. Natural language processing is applied to text data from transactional data to generate a consolidated cleaned data set (CDS) containing information for categorization. Logs for transactions are clustered based on similarity, forming the minimal data set (MDS). An automated algorithm selects a subset of high-value clusters that are categorized by requesting users to manually categorize one or more representative logs from each cluster of the subset. A model is then trained using the subset of manually categorized clusters and used to predict spend categories for the remaining logs with high accuracy. The AI engine automatically analyzes the predictions based on client context and either auto-tunes the machine learning model or identifies a new subset of clusters to be manually categorized. The disclosure focuses on data cleansing and not around providing summary data.

US20240184777A1 discloses a method for querying and analyzing datasets via natural language processing (NLP) with context propagation. In one embodiment, a computer-implemented method includes receiving, by a user interface, at least one of an utterance or a structured query language statement. The method includes identifying zero or more previous data conversation steps indicated by the utterance. Generally, this disclosure is directed to SQL generation, which indicates connecting only to relational databases or RDBMs.

AU2022396273A1 discloses a method for configuring and launching a marketplace. An opportunity to facilitate configuration of a new marketplace is identified and marketplace opportunity data is received. The marketplace opportunity data includes information related to a set of assets of one or more types. Configuration parameters to be implemented in the new marketplace are determined and analyzed for implementation feasibility.

US20230342392A1 discloses generative AI systems and methods to produce leading indicators of economic activity based on, for example, agricultural, fishing, mining, lumber harvesting, environmental, or ecological attributes and other factors determined from a range of available data sources. This disclosure provides large scale economic projections.

Prior art and related patents present in this space appear to focus on predicting stock market pricing based on analysis of reports and other factors. Effectively, these art references are robo-advisors used for picking stock and for investment analysis purposes. This is quite different from innovations that focus on intra-company operational and finance operations (e.g., Financial Planning and Analysis and/or accounting departments of a company would be intended users).

SUMMARY OF THE EMBODIMENTS

One aspect of the disclosure improves the efficiency and accuracy of Financial Planning & Analysis functions within large companies. This improvement is facilitated via a chatbot tool, which functions against financial systems in an organization. Key tool components include a chat interface, a presentation component, a visualization component, a forecast component, and an AI component. The AI component provides AI capabilities to the other components (chat, presentation, visualization, and forecast). Behind the scenes, the tool provides data reconciliation functions, which permits information to be gathered from multiple sources, which are reconciled to each other. This is significant, as typical organizations and company utilize a myriad of software tools, within which key company data is stored. Many of these existing tools use differently structured databases to function. Data sources include various types of databases relational and non-relational ones, as well as data cube structures (e.g., represents data as a multi-dimensional ("n-D") array of values). The query functions of the disclosure permit natural language queries and other queries through a chatbot or chat-like interface. In embodiments, the chatbot tool allows information to be exported into a spreadsheet format (e.g., EXCEL, GOOGLE SHEET, etc.). Further, information can be exported into a slideshow (e.g., POWERPOINT, GOOGLE SLIDES, etc.), which includes generated commentary, and templates use.

One aspect of the disclosure includes a system and a method for an analytics chat interface for tabular information reliant on AI and proprietary financial information stored in various database formats for a company. This aspect can include at least one processor and one or more computer-readable hardware storage devices storing computer readable code. The code and data includes that forming a knowledgebase and a chatbot interface. The knowledgebase includes proprietary, non-public financial planning and analysis information for a company or organization. The information is maintained in different databases or data sources having different structures-one of these databases being an RDBMS and another being a multidimensional database having a cube structure. The system includes a chatbot user interface (UI) configured to simulate human conversation input through a natural language input section of the chatbot interface and a chatbot response section. Execution of the computer-readable code is configured to be executed by the processor causing the system to perform natural language (NL) understanding functions on inputs of the natural language input section of the chatbot UI. A user inquiry of the knowledgebase is determined based on results of the NL understanding functions. The data sources and types of data structures to be accessed to resolve the user inquiry are determined. When it is determined that one of the data sources relies on an RDBMS structure, at least a portion of the user inquiry is converted into a SQL query. The SQL query is executed against determined one of the data sources to produce a first responsive table. When it is determined that one of the data sources is a multidimensional database having a cube structure, at least a portion of the user inquiry is converted into a multidimensional query comprising parameters and dimensional variables. The multidimensional query is executed against a multidimensional database to produce a second responsive table. A result table is presented in the chatbot response section. The result table is either the first responsive table, the second responsive table, or a combination of the first and second responsive tables.

BRIEF DESCRIPTION OF THE DRAWINGS

FIG. 2A depicts an interface for an analytics chatbot, in accordance with embodiments of the present invention.

FIG. 2C depicts an interface for a generated table with a context menu popup, in accordance with embodiments of the present invention.

DESCRIPTION OF THE PREFERRED EMBODIMENTS

Figure 1:
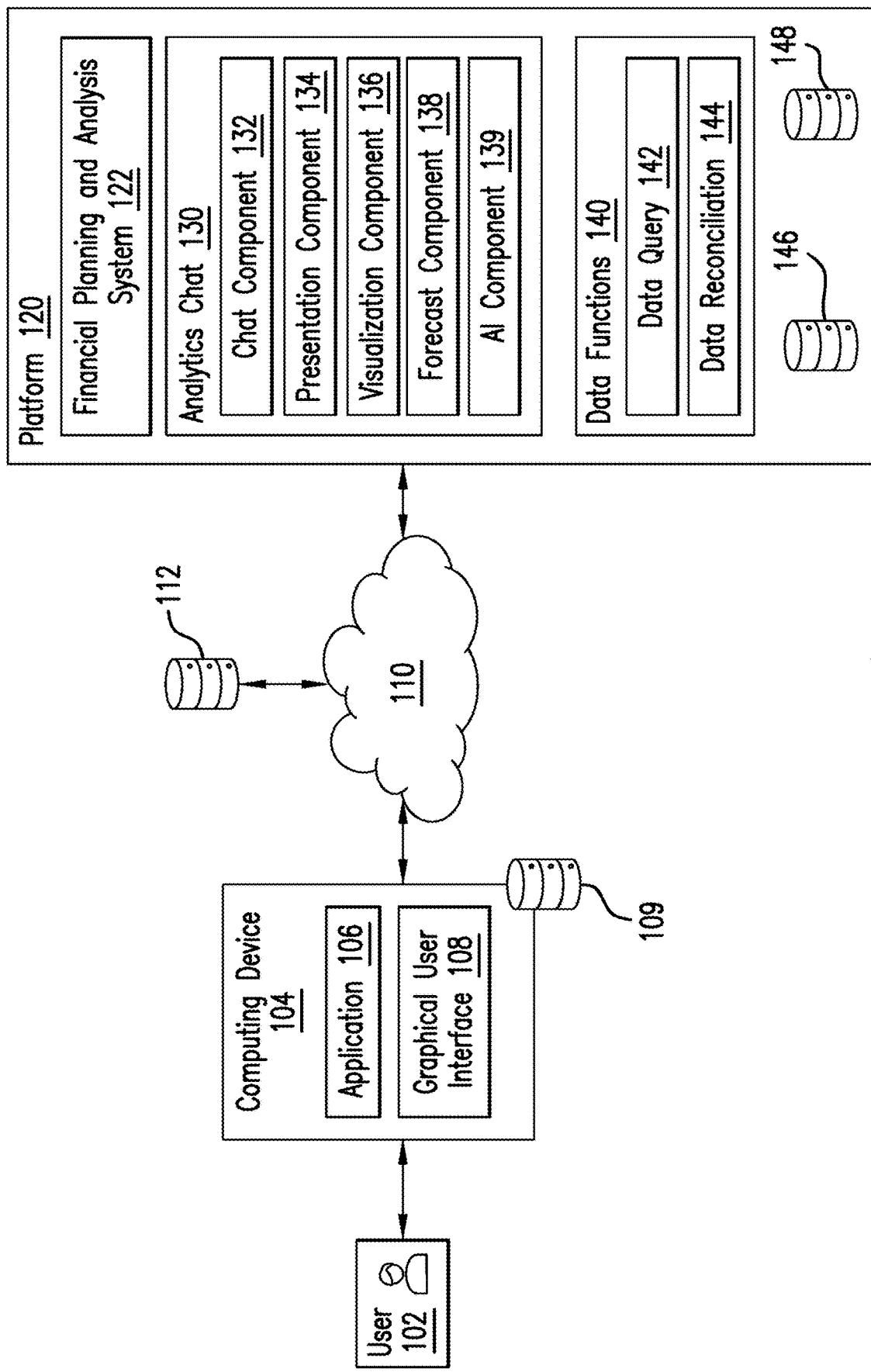
FIG. 1 depicts a schematic diagram of a system, in accordance with embodiments of the present invention.

The preferred embodiments of the present invention will now be described with reference to the drawings. Identical elements in the various figures may be identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

A chatbot is a computer program (software application or Web interface) that simulates and processes human conversation, either in written or spoken form. Generally, a chatbot is designed to mimic human conversation through text or voice interactions. In embodiments, chatbots can use deep learning, natural language processing, and/or machine learning over large data sets, as is performed by CHATGPT, MICROSOFT COPILOT, and GOOGLE's GEMINI. Language models tailored to a specific situation or subject matter domain are smaller, more accurate, and simpler. As used herein, the analytics chat 130 (see FIG. 1) is focused on internal financial planning and analysis for a specific company and/or organization. As such, its backend (or knowledge base) is integrated to private internal company/organization financial information, such as that available via a financial planning and analysis platform (132), such as ONESTREAM or ORACLE ENTERPRISE PERFORMANCE MANAGEMENT (EPM). Key tool components include a chat interface or component 132 (FIG. 2A), a presentation component 134 (FIG. 2B), a visualization component 136 (FIGS. 3C, 3D, AND 3E), a forecast component 138, and an AI component 139. The AI component 139 provides the deep learning, natural language processing (NPL), the machine learning (ML), and other AI functions detailed herein.

Behind the scenes, the tool provides data functions 140, which includes data query 142, and data reconciliation 144 ones. Various data stores 109, 112, 146, 148 including internal and external ones are accessed and utilized by the data functions 146. Effectively, a knowledge base 610 (See FIG. 6) is established that receives feeds and updates from one or more relational databases (RDBMSs), from EPM solutions, from data cube structures, as well as relevant manuals and definitions used by the knowledge base 610. FIG. 5 provides an overview of a way knowledgebase 610 integrates EPM and RDBMS information. Flow charts for data queries, presentation generation, dashboard creation, forecast/modeling, and data reconciliation are provided in FIG. 4A, with data query elaboration being presented in FIG. 4B. FIG. 4C provides action menu elaborations for generating spreadsheets, presentations, visualizations, and audits.

With reference to FIG. 1, a set of users 102 utilizes computing device 104 to interact over network 110 with platform 120. The computing device 104 can have an application 106 installed for interfacing with platform 120 and more specifically to financial planning and analysis system 122 and/or analytics chat 130. User 102 interactions occur via user interface 108, which will generally be a graphical user interface (GUI), although voice user interfaces (VUI), command line interfaces (CLI), touch screen interfaces, extended reality (XR) interfaces, virtual reality interfaces (VR), and the like.

Platform 120 can be a platform enabled on a company's intranet, which may be remotely accessible to authorized users (e.g., user 102). One or more financial planning and analysis systems 122 can be used by the platform, which are integrated with analytics chat 130. Sample systems 122 can include, but are not limited to ONESTREAM, which is a performance management solution that unifies performance management processes such as planning, financial close and consolidation, reporting, and analytics through a single platform. Similar system 122 solutions can include, but are not limited to, ANAPLAN, FLOQAST, ADAPTIVE INSIGHTS, WORKIVA, PLANFUL, VENA, BOARD, CCH TAGETIK, and the like. In one embodiment, systems 122 can include software such as ORACLE ENTERPRISE PERFORMANCE MANAGEMENT (EPM), which is a suit of performance management applications that include business intelligent tools and services, as well as various data sources. Additionally, systems 122 can include numerous OFFICE, such as MICROSOFT OFFICE, and accounting software solutions.

In embodiments, analytics chat 130 can be integrated to one of more of system 122 applications, such as being implemented as an integrated component or customized add-in module of ONESTREAM and/or ORACLE EPM. In another embodiment, the analytics chat 130 can be a stand-alone application providing the features and functions detailed herein.

The analytics chat 130 can be provided access to data store 146, 148, and to functions and calls implemented as components of system 122. In embodiments, platform 120 and chat 130 have access to various data stores including data store 146, 148, 112, and 109, where various data functions 140 can be performed thereon, as detailed herein. As used herein, a data store can include a physical storage space or device that stores digitally encoded information. Hard drives, hard drive arrays, solid state storage, optical storage, magnetic storage (and backups), and the like are common devices that store digital data are contemplated herein. Numerous data indexing and storage methodologies are employed for data, which includes relational database management systems (RDBMS), such as third normal form RDBMSs), less rigid and more forgiving database structures, such as zero database ones that do not enforce strong referential integrity rules, and data cube structures.

Figure 6:
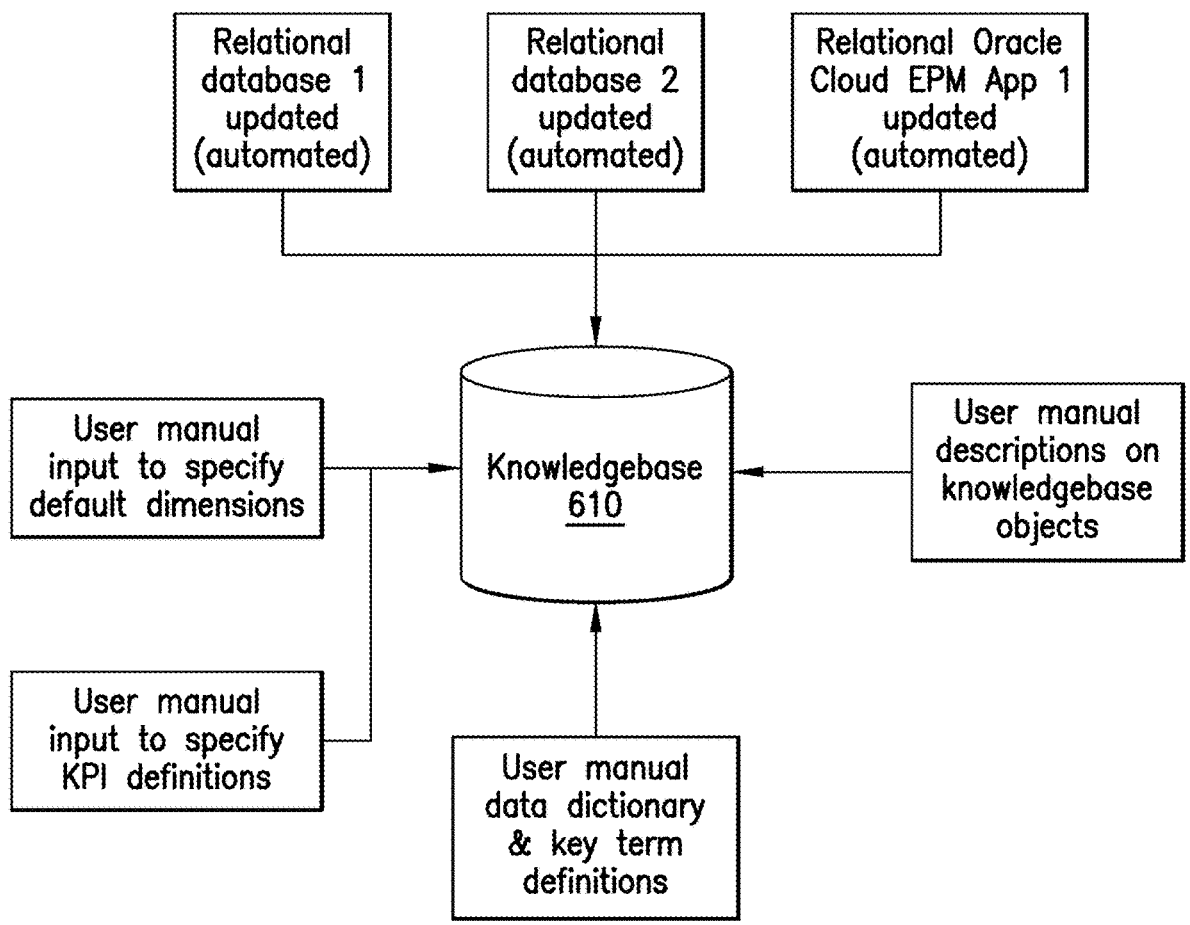
FIG. 6 illustrates a knowledgebase in accordance with embodiments of the present invention.

With reference to FIG. 6, generally, the set of information utilized by analytics chat 130 is referred to as knowledgebase 610. Knowledgebase 610 is stored within a propriety data store (146, 148). Analytics chat 130 leverages the knowledge base to assist in functions/features for the data query 142, data reconciliation 144, and AI component 139. For example, for divergent data sources to be reconciled, RDBMS schemas are defined and utilized. Structure based query (SQL) operations can be utilized against RDBMS recorded data once RDBMS schemas and related reconciliation actions are taken. RDBMS schemas define key information such as primary/foreign key information, table structure(s), attributes, attribute lengths, column definitions, referential integrity rules, and the like. Schemas, RDBMS input/export features, table reconciliation actions, and various interface/library/function calls exist for all popular software implementations, such as ONESTREAM, ORACLE EPM, MICROSOFT OFFICE (EXCEL/ACCESS with POWERPOINT tie-ins for visualizations, charting, graphing, etc.), as well as accounting software, tax software, customer relationship management (CRM), project management, and the like. Effectively, company/organization proprietary information including key performance indicator (KPI) formula definitions, and other applicable metrics required for the language model (knowledge base 610) to understand the context around the data query 142 is established for the knowledge base 610. Thus, FIG. 6 shows an integration of KPI's, definitions, manuals, as well as various RDBMSs and EPM applications for establishing, maintaining, and updating knowledgebase 610. At least a portion of the relied upon data sources can be external ones, such as those represented by network 110 connected data store 112.

With reference to FIG. 5, an RDBMs (used for knowledgebase 610) has a schema (Schema 1), which a series of defined and interrelated tables, each having a set of columns, each table that enforces unique records has a primary key, which is table unique. A foreign key is a reference to a primary key of another table. For example, in a name table, a unique key could be a social security number or driver's license number, which can be considered a primary key for that table. An organization table, which lists information for organizational positions can have people fill these positions (yet a many-to-many relationship may exist as each person may have more than one position and each position may be filled by more than one person). Each position in the organization table can have a unique identifier (primary key) for that position. A join table (including foreign keys associating unique primary keys between the tables) can exist. Thus, each person with a "section manager" identifier (primary key) can be linked (via social security/DL number) to people that are section managers via a join table. Well-structured RDMBs are often said to be in third normal form (3NF), which is a database schema design approach for relational databases which uses normalizing principles to reduce the duplication of data, avoid data anomalies, ensure referential integrity, and simplify data management. Although 3NF is assumed by default and is linked to the concepts of SQL, SQL queries, and schemas, many modern databases are not constrained by 3NF. For example, a NoSQL database utilizes NoSQL queries and normalization forms (NFs) required by well-structured RDBMs do not generally apply. Further, concepts such as inheritance and object oriented databases (OOD) are common and are part of knowledgebase 610.

To elaborate with reference to FIG. 5, ORACLE EPM permits multidimensional data to be defined by dimensions and cubes. As shown, the EPS can rely on data cube structure and dimensions, which include multiple members. Inherence principles also exist, so parent and child objects or members are definable. For a multidimensional data source linked to knowledge base 610, the data query features (142) may require a multidimensional expression (MDX) query or a web service request. For web service requests, data exports are typically performed by specifying dimensional members organized in a point of view (PoV), row, and column designations. The data exists at the intersection of these provided members. The Knowledgebase 610 for a multidimensional database contains key information such as applicable dimensions for the application, valid dimension members for each dimension, and other application configuration settings required to help the language model identify the required members and assignment to the PoV, row, and/or column configurations. The knowledgebase can be built using a relational database, a graph database, a vector database, or a combination of databases.

Appreciably, analytics chat 130 references knowledgebase 610 to perform many of its functions. Knowledgebase 610 is designed to store information relevant to the execution of the functions. Knowledgebase 610 can be designed using a graph representation of the information, a relational database, a vector store, or a combination of databases. The key information housed in knowledgebase 610 is related to the database definitions, application metadata, and relationships between the different data sources. For example, a relational database will contain information related to the connection details of the data source. It will also detail the schemas associated with the database (see, for example, FIG. 5). Database objects, such as tables, views, and materialized views will also be detailed in the knowledgebase along with their applicable columns and the data types associated with the columns. Knowledgebase 610 will also contain information like KPI calculations, data dictionaries, and any applicable information that will be used to generate database queries (See FIG. 6). Multidimensional database applications, such as ORACLE CLOUD EPM will have applications and cubes associated with the application. Dimensions for each application will be specified along with default values for each cube. These default values will be used to form multidimensional queries where the user hasn't specified a valid member from each dimension. For each dimension, the dimension members and associated hierarchies are defined in the knowledgebase. The members for each dimension are also mapped to the appropriate cube. For any applications requiring data loads, the source systems are mapped to the target systems in the knowledgebase. Applicable data mappings and transformations are also stored in the knowledgebase so that data reconciliations can be automated. In addition to the application metadata, KPI definitions and company-specific information.

It is important to keep knowledgebase 610 up to date so that the system can be as accurate as possible. Keeping the knowledgebase 610 up to date is a mix of automated and manual processes. The system can automatically pull application and database metadata to automatically update schema information and general metadata. There are some updates that require manual specification, such as default values for members in multidimensional applications. There may be some client-specific information that cannot be automatically derived from application metadata and schema information. For this information, input forms will be available to ensure that the system can ingest the applicable information.

Figure 4A:
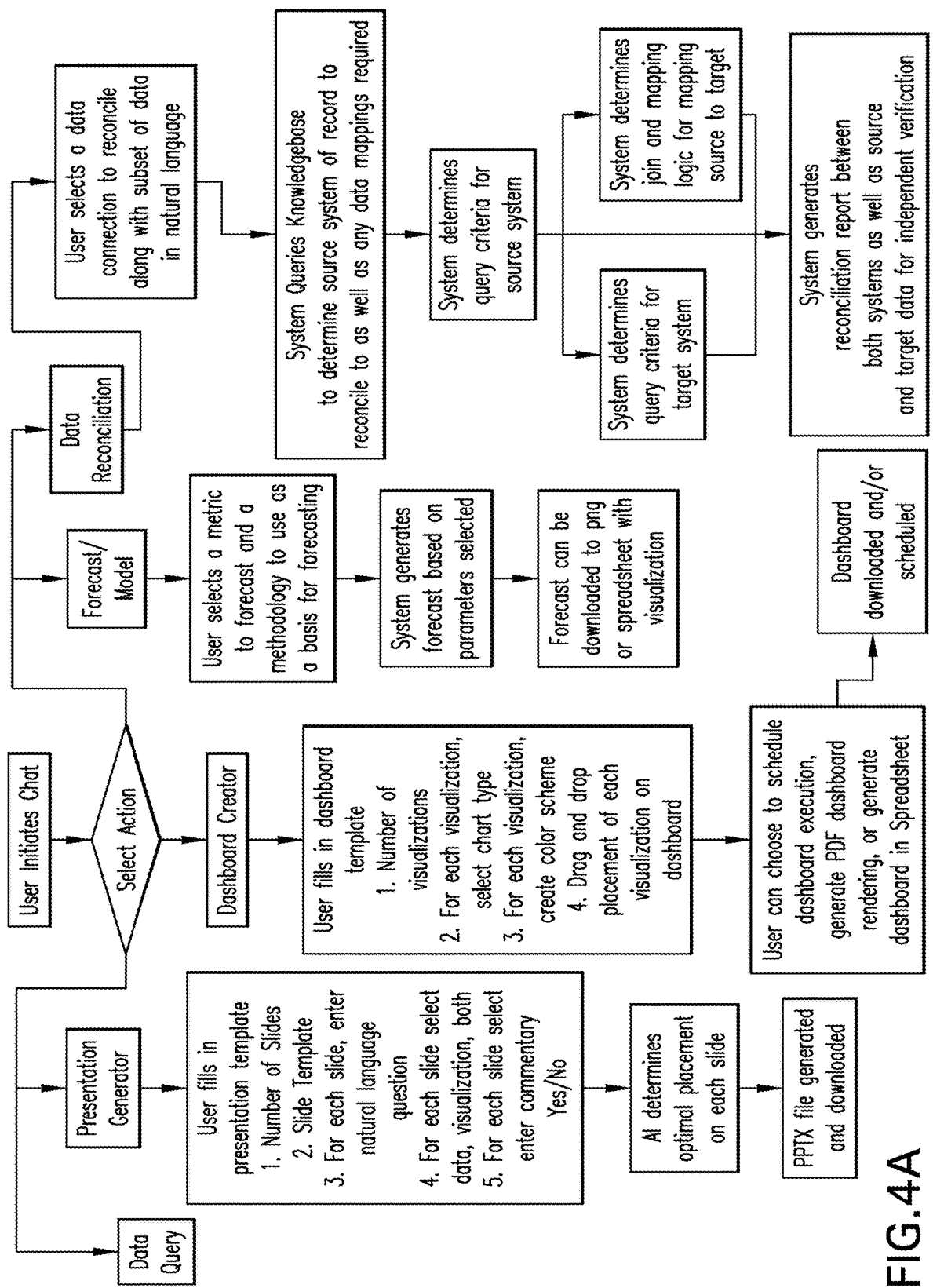
FIG. 4A shows a flow diagram for actions taken after chat is initiated in accordance with embodiments of the present invention.
Figure 4B:
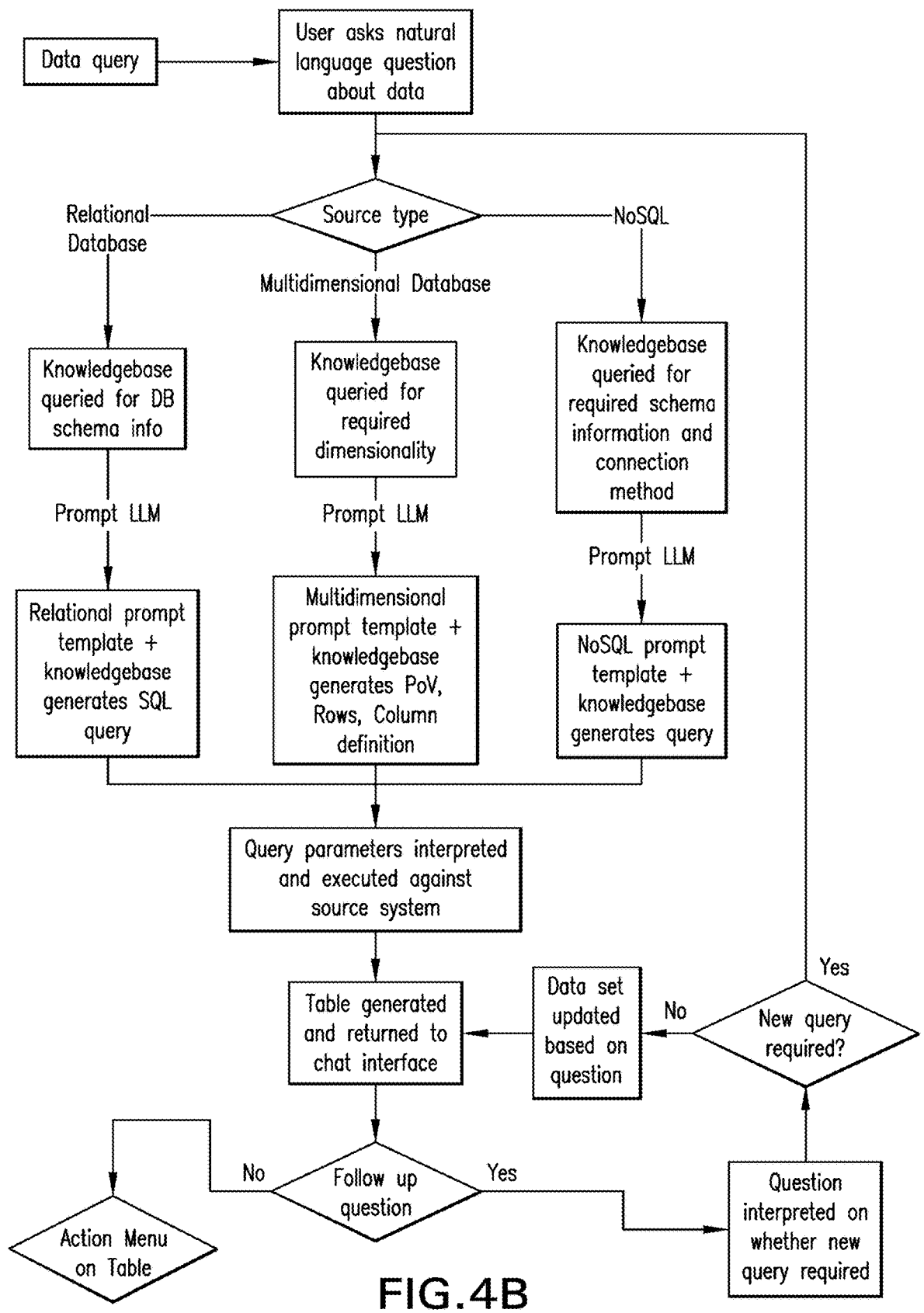
FIG. 4B shows a flow diagram for a data query in accordance with embodiments of the present invention.
Figure 4C:
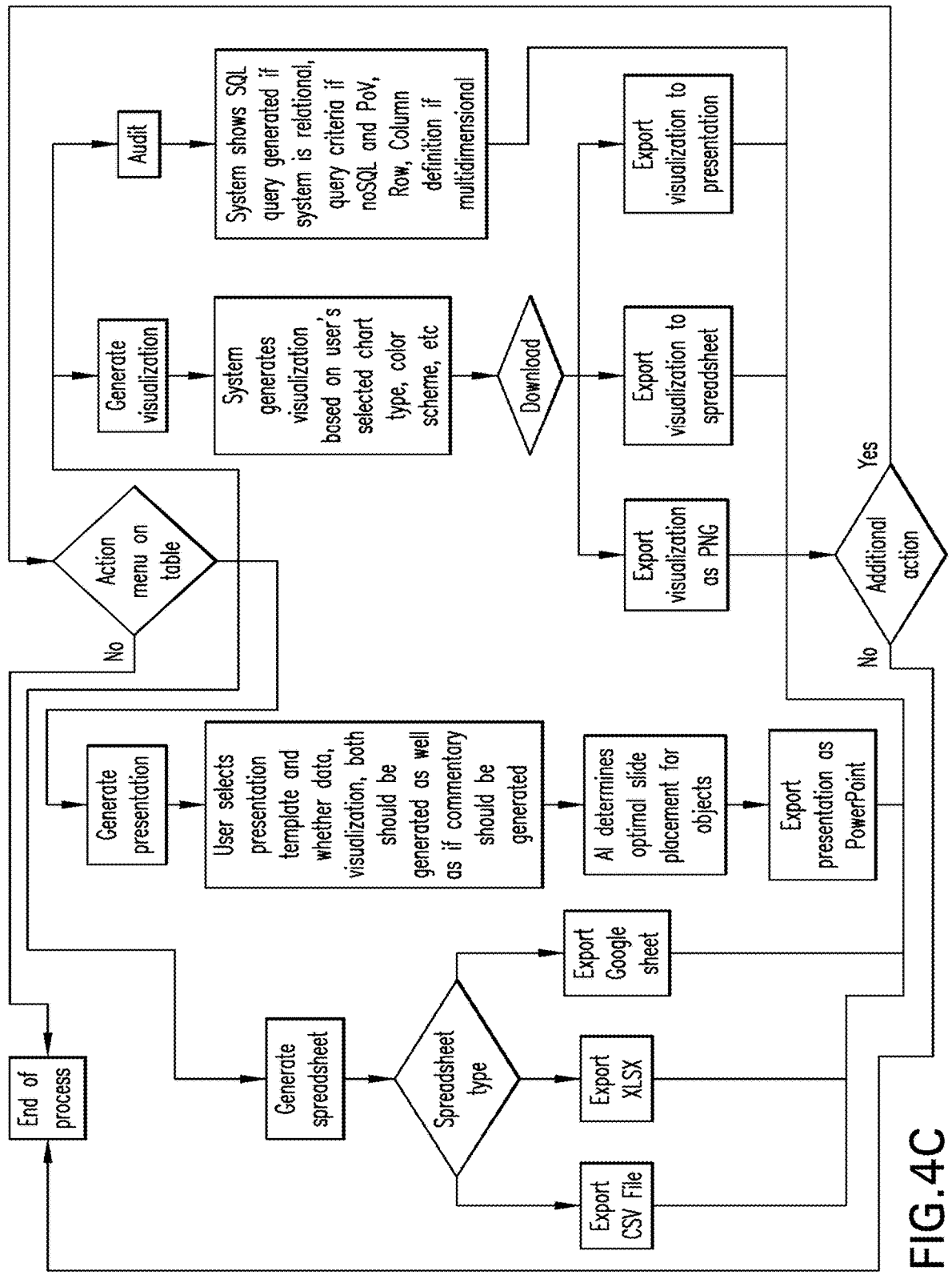
FIG. 4C shows a flow diagram for actions taken against a generated table in accordance with embodiments of the present invention.
Figure 5:
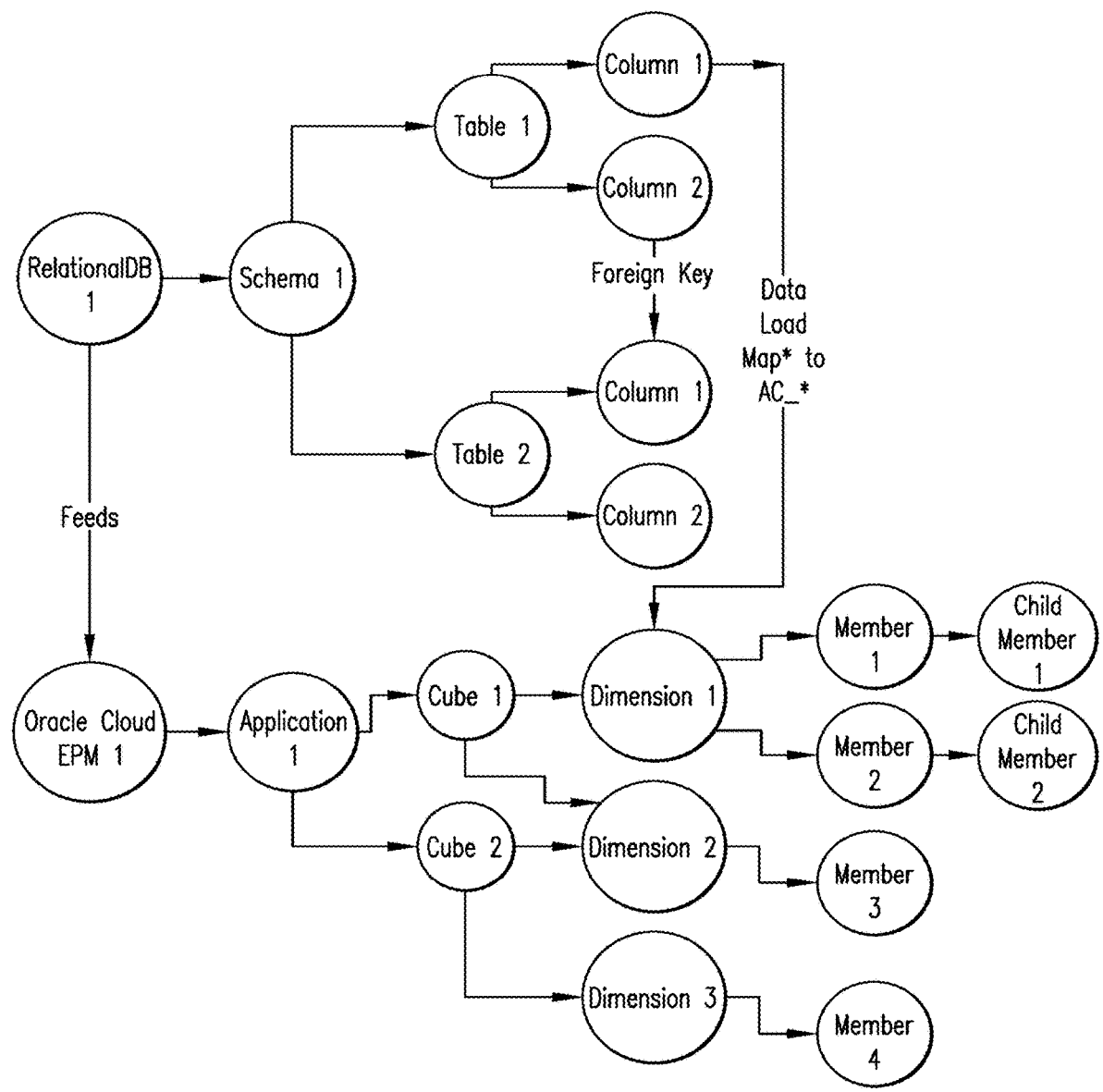
FIG. 5 shows a flow for reconciliating data from different types of sources in accordance with embodiments of the present invention.

With reference to FIGS. 4A, 4B, and 4C various key functions of the analytics chat 130 are elaborated upon. The process being when a user initiates a chat (e.g., via an interface such as FIG. 2A), which results in an action being selected. Actions can include those of a data query, a presentation generator, a dashboard creator, a forecast/model, data reconciliation, and/or the like.

For presentation generator, a user fills in a presentation template. This can include defining several slides and selecting a slide template. For each slide, a user may enter a natural language question. For each slide, a user may select data, visualization(s), media, and combinations. Commentary can be automatically generated for a slide or not, depending on user choice. In one embodiment, the AI (component 139) can determine an optimal placement of content on each slide. A PPTX or other presentation file extension can be generated and downloaded. This file can be edited after creation. In one embodiment, slide previews can be shown prior to file creation, which can be edited during the presentation creation process. Specific user 102 or organization preferences about presentations can be applied by default. In embodiments, the AI learns from user 102 and/or organization feedback, which alters the created presentation to suit preferences over time. For example, edited slides (from manual user 102 edits) can be compared to AI generated ones and ML feedback improvement loops can be established to minimize delta and a need for users (102) to edit delivered presentations.

Another selectable action is for a dashboard creator for visualization component 136. There, a user 102 fills in a dashboard template. This can include specifying a number and type of desired visualization. For each visualization or chart a color scheme or presentation template can be selected. In embodiment, the system can permit drag and drop placement of each visualization on the dashboard. Further, a user may choose to schedule a dashboard execution, to generate a PDF dashboard rendering, or to generate a dashboard in a spreadsheet. After all settings are input, the dashboard is downloaded and/or scheduled. Like the presentations, created dashboards, charts, and the like can be modified by a user 102 after creation. Modifications and other ML feedback loops can be established to train the AI component 139.

When the forecast/model is selected, a user can select a metric to forecast and a methodology to use as a basis for forecasting. The system generates forecasts based on parameters selected and based on knowledgebase 610 information. Generated forecasts can be downloaded (and edited) after creation. Forms of forecasts can include those of an image file (e.g., png), a spreadsheet with visualization(s), and the like. AI (139) aspects of forecasts can be trained and improved.

When a data reconciliation task is selected, a user can select a data connection to reconcile along with a subset of data. Natural language input is accepted for this purpose. The system can query knowledgebase 610 to determine source system(s) to reconcile. Necessary data mappings used in the reconciliation are determined at this stage. The system may determine query criteria for a target system. The system may also determine query criteria for a source system. The system may also determine join and mapping logic for mapping the source to target. The system generates reconciliation reports between both systems (target and source) as well as source and target data for independent verification. In embodiments, knowledgebase 610 preserves pre and post reconciliation states and can rollback data, when an attempt at reconciliation is unsatisfactory. In embodiments, effectuated knowledgebase 610 updates affecting multiple people in a company (as opposed to a generation of a personal data view) may require administrator (of knowledgebase 610) permissions. In embodiments, computer technicians can approve types of generated reconciliation actions and/or tweak performance of the reconciliation actions prior to widescale deployment. For example, user 102 made changes via reconciliation can be sandboxed (so as not to affect others) until/unless approved by an appropriate administrator. Thus, data reconciliation actions can be taken via analytic chat 130 per user 102 direction without negatively affecting a quality of knowledgebase 610 used generally by an organization (those other than user 102).

FIG. 4B elaborates upon a data query in embodiments of the disclosure. A user can ask a natural language question about data. The question may involve multiple data store types, such as relational database, multidimensional databases, and NoSQL ones. For a RDBMS, knowledgebase 610 may be queried for schema information. A user can be prompted to provide additional information needed to generate a SQL query (unless one previously exists, in which case it can be used). For a query that requires dimensionality, a user can be suitably prompted, which results in the creation of a PoV, Rows, and Column definition needed to satisfy the natural language (NL) posed question. For a NoSQL database, required schema information is gathered, user input prompted and received as necessary, which produces a suitable NoSQL query.

After database type appropriate queries (subqueries) are created, query parameters are interpreted and executed against the source system(s). A table is generated and returned to the chat interface. Information about this process can be stored and reused, so that similar queries are able to leverage past work to improve system efficiency. Follow up questions can be received through the chat interface. When a new query is required, it can be generated, and results (in the form of generated tables) suitably updated. Once a suitable table is generated to satisfy a user's question various actions can be taken on the generated table(s).

With reference to FIG. 4C, user 102 may opt to take no actions on a table, which ends the process. The user can generate a spreadsheet based on the table. Different types of spreadsheets can be specified. For example, a CVS, an XLXS, a GOOGLE SHEET, and the like can be exported. Additional actions can be taken as indicated.

Another action to be taken on the table is to generate a presentation. For example, a user can select a presentation template and whether data, visualization (charts, etc.), should be generated for the presentation. Additionally, commentary (i.e., slide notes, content, etc.) can be optionally generated. An AI function can determine optimal slide placement for objects. A presentation, such as a POWERPOINT one, can be exported.

A generate visualization action can be selected for the table. There, the system generates a set of visualizations based on a user's selected chart type, color scheme, and the like. The visualization can be downloaded/exported as an image (PNG, JPG, etc.), a spreadsheet, a presentation file, and the like.

In one embodiment, an audit action can be selected. Such an action can show details of the query that was generated. For an RDBMS source, the query can be a SQL one. If multidimensional query criteria including PoV, Row, Column definition, etc. can be shown.

Figure 2B:
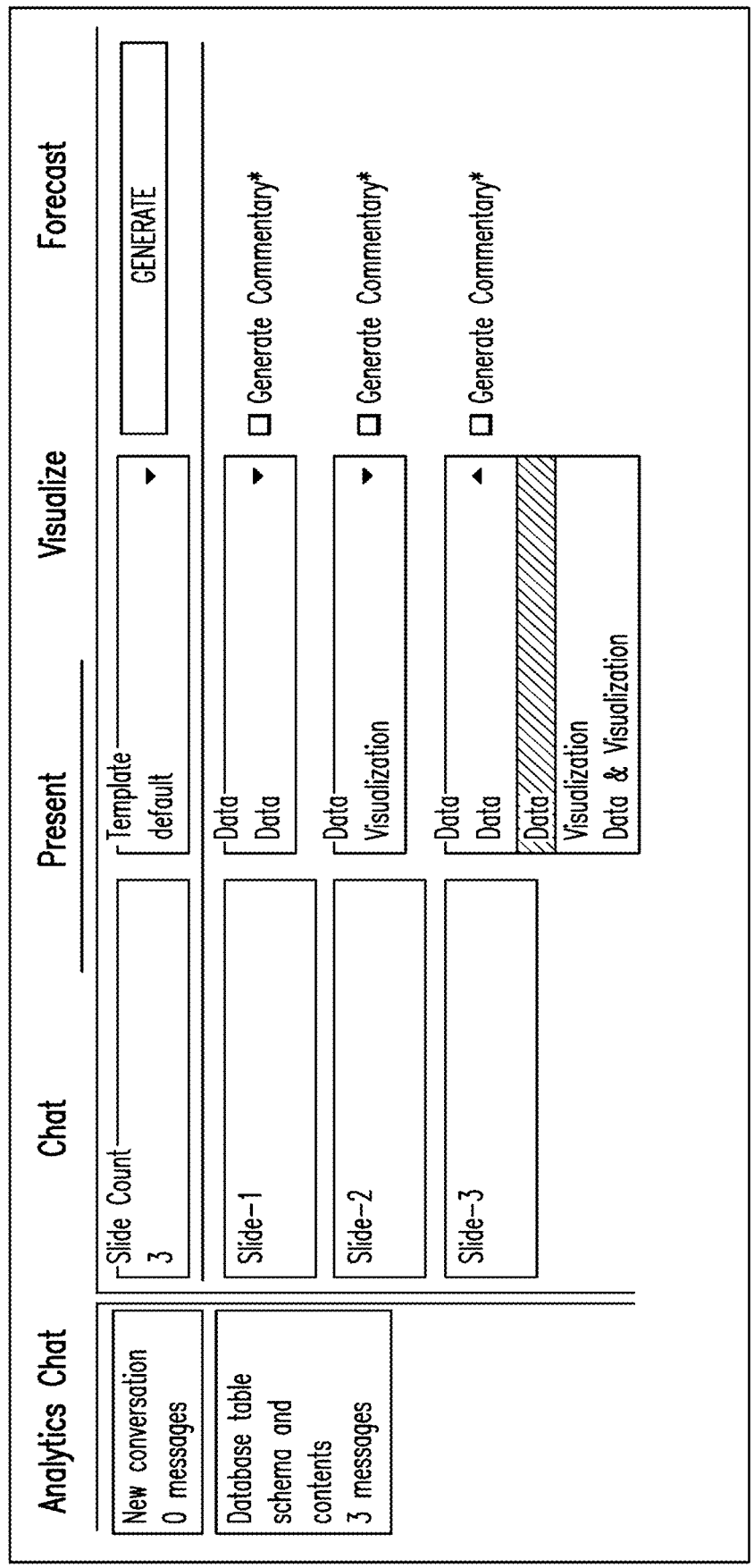
FIG. 2B depicts an interface for presentation generation, in accordance with embodiments of the present invention.

FIG. 2A shows a sample query that provided a tabular result for total sales of various products by category. FIG. 2B shows a presentation generation screen, where a three slide presentation is generated without commentary. As shown, different types of content (data, visualization, data and visualization both) can be automatically generated for each slide.

Figure 2D:
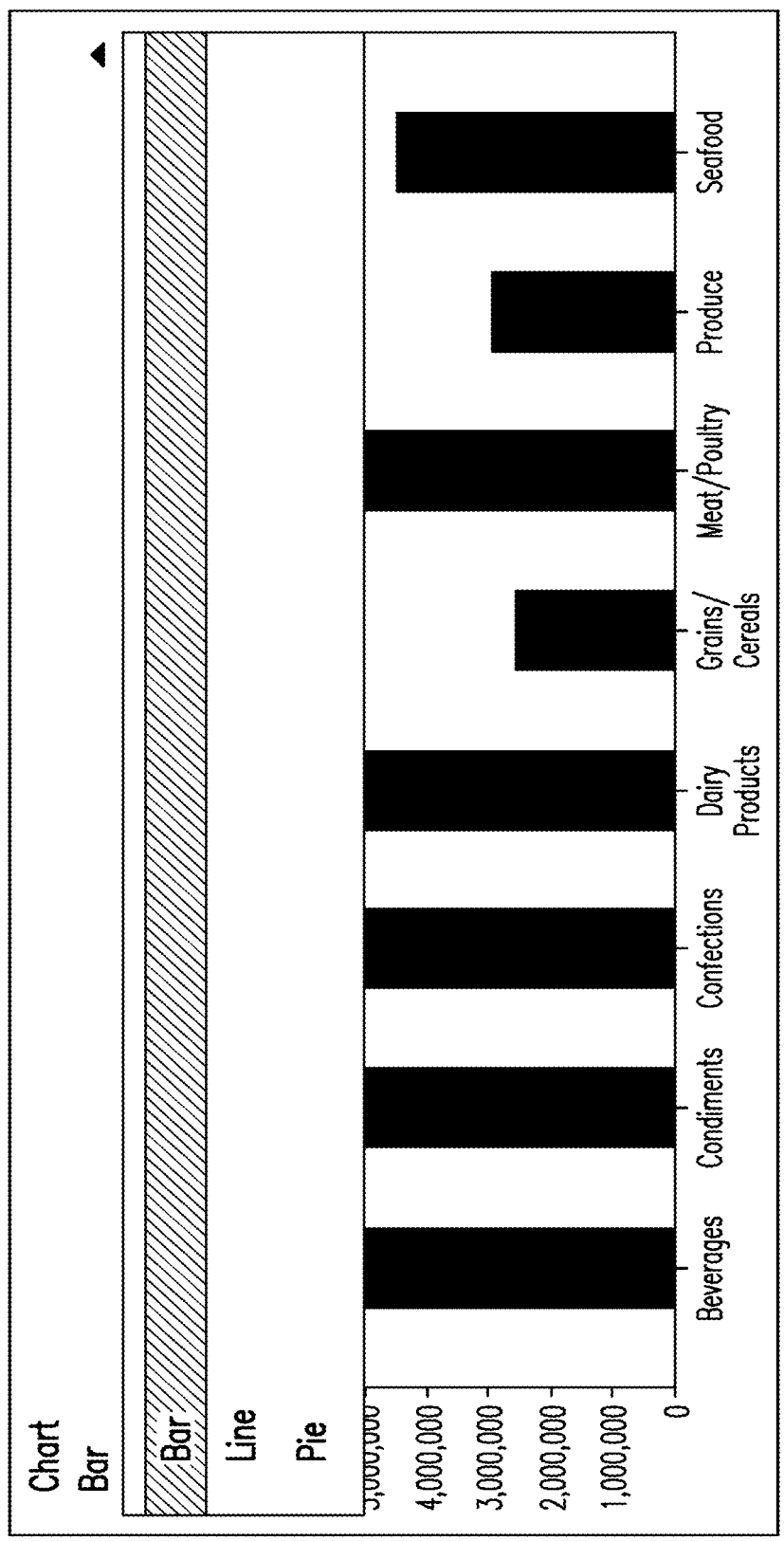
FIG. 2D depicts an interface for a visualization in accordance with embodiments of the present invention.
Figure 2E:
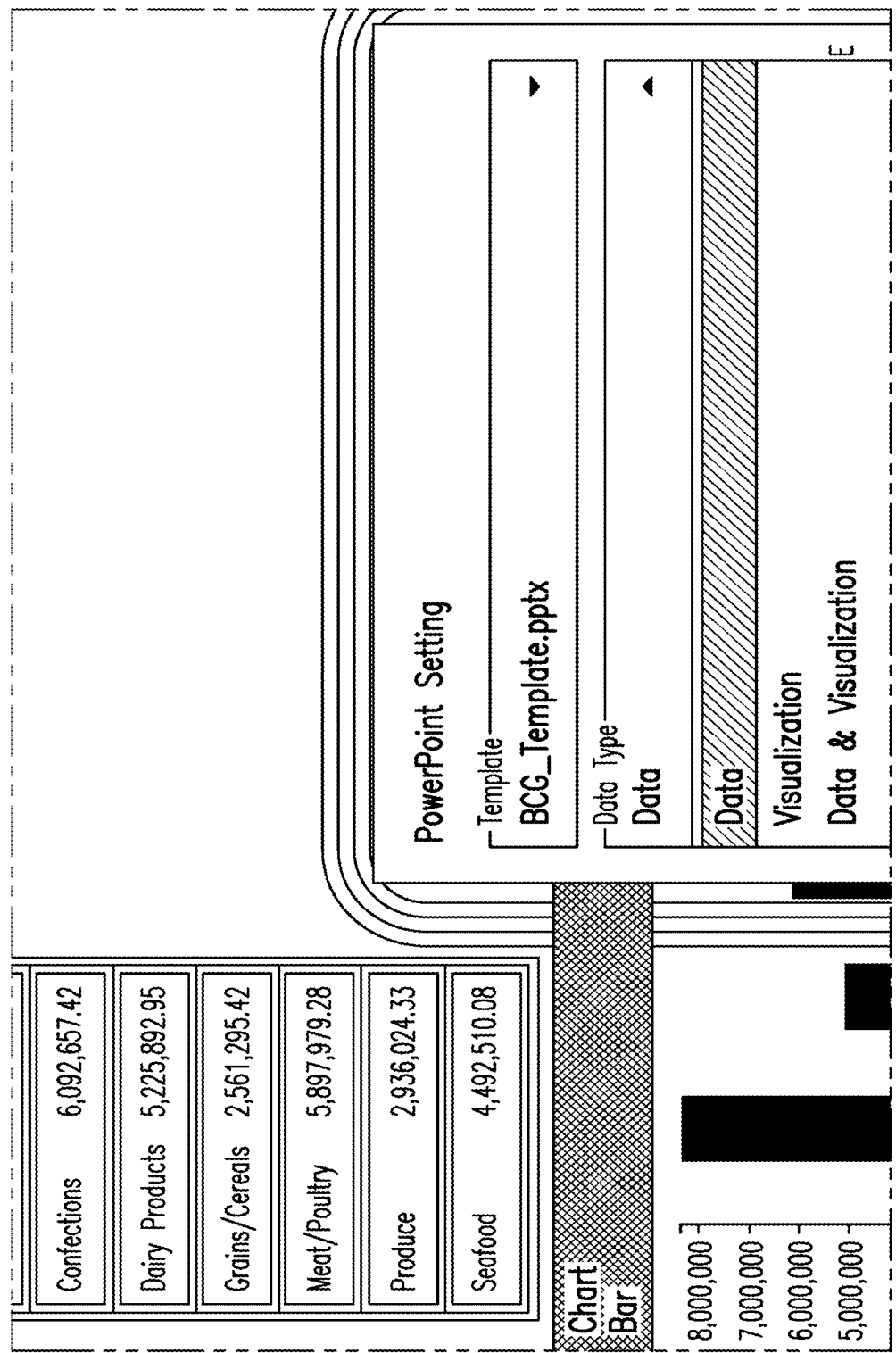
FIG. 2E depicts an interface for specifying presentation parameters in accordance with embodiments of the present invention.

As shown by FIG. 2C, a right mouse (or other GUI action) can provide a set of creation options for any selected and displayed table, such as that of FIG. 2A. As shown, the query can be shown, a spreadsheet can be created, as can a presentation or a visualization. FIG. 2D shows various types of graphs (e.g., bar, line, pie) that can be created as visualizations based on the table information. FIG. 2E shows a popup for inputting presentation options, which may appear when a presentation option is selected from the right-mouse menu of FIG. 2C.

To summarize, the purpose or objective of the disclosure is to improve the efficiency and accuracy of Financial Planning & Analysis functions within large companies or organizations. The tool is a chatbot (analytics chat 130) operating using a knowledgebase 610 linked to the company's financial planning and analysis system(s) 122.

As noted, the analytics chat 130 can retrieve data from knowledgebase 610. For example, user 102 can ask questions in natural language (NL) against relational databases (RDBMSs), non-relational databases, as well as multidimensional cubes. The analytics chat 130 creates the appropriate query and method for connecting to the knowledgebase 610 data, and retrieves the data in a structured table format, such as the table shown in FIG. 2A. The table can be audited to view the underlying query/query criteria used to generate the response. The table can be exported into a spreadsheet format. The table can also be exported to POWERPOINT or other presentation format. A visualization can be created, such as an image, chart, or table. Table, spreadsheet, and visualization creation operations can utilize user defined/selected parameters and can be generated automatically at least in part by AI component 139.

In one embodiment, user 102 can create a fully formatted POWERPOINT slide deck (such as a board/management report) from their data. User 102 may enter a number of slides and choose a slide template. User 102 can enter a natural language description of data to put in each slide along with whether to show a data table, visualization, or both on the slide. The user can optionally choose to generate commentary on the slide.

As noted, a user can create dashboards. This is effectively the same basic concept as used to create presentations except user can describe data sets and turn them into visualizations on a dashboard. Visualizations can be dragged/dropped to different locations on the dashboard for optimal display.

In another embodiment, user 102 can create a forecast, which may leverage formulas, functions, analysis, tables, and the like from spreadsheet programs, which may be populated in part by AI component 139 based on knowledgebase 610. In one embodiment, user 102 can request a forecast for sales for the next X months. The system (chat 130) can responsively generate a time series analysis or advanced forecast to show the requested projection based on knowledgebase 610.

Further, tasks to reconcile data are performed. There, user 102 selects a subset of the data (e.g., "Please reconcile my data from ORACLE EPM for last month") and analytics chat 130 can responsively consult knowledgebase 610 to determine which data sources are needed and perform applicable mappings. A full reconciliation report is generated showing data tying and where it is not tying.

In one embodiment, the analytics chat 130 is an application accessed via a web browser with a login screen. Once logged in, user 102 has access to run a series of actions that will perform a series of different tasks, as detailed herein (See FIG. 2A-2E and FIG. 4A-4C).

The data query 142 feature of the software can query data using natural language. A user can enter a question, such as "What were my sales for January 2024 broken down by category?" and the system will determine the optimal source for the data. Once the data source is determined, the system generates a query that will return the requested data. Based on the data source, the system determines what type of query it needs to generate. For example, if the data source is a relational database, a SQL query needs to be generated in order to return the requested data set. If the data source is a multidimensional database, an MDX or Web Service request may need to be generated to return the requested data. If the data source is a NoSQL database, then a NoSQL query needs to be generated. Other access types, such as web services, can also be generated using the system.

Once knowledgebase 610 is queried for the applicable information, the relevant information is passed into a prompt template (FIG. 2A) which is sent to an LLM for processing. The LLM returns either an exact query to be run directly against the data source or a template to pass into a dedicated function in the application designed to query the data source. After the data source is queried, the results are retrieved and formatted into a data table. The resulting table is rendered to user 102. Once the data table is rendered, user 102 has the option to ask a follow-up question for the data, a new question for that data source, or perform an action on the returned data table. An example of a follow-up question may be "Can you show me the top 5 results and order from highest to lowest?" If a follow-up question is asked, the system will first determine whether a new query needs to be generated or if the resulting data set would be a subset of the existing data or a reformat of the existing data. If a new query is needed, the system uses its knowledgebase to pass in the follow-up question along with relevant information to the respective prompt. The remaining steps are rerun to generate the query. If the follow-up question does not require generation of a new query, the system determines what changes need to be applied to the existing data set and makes those changes. The new data table is performed.

In one embodiment, analytics chat 130 contains a scheduling engine that allows custom actions to be performed on a recurring basis. Users 102 can schedule common tasks on a flexible, recurring basis so that these tasks can be automatically run and results distributed to the appropriate person or group. Common tasks can include reports, dashboards, presentations, forecasts, reconciliations, or general questions. Users 102 can see what tasks have been scheduled and which tasks are upcoming. The user can adjust or cancel any task that has been scheduled. An audit log can also be run or queried to see past executions of tasks and their status.

Systems, Devices and Operating Systems

Figure 3:
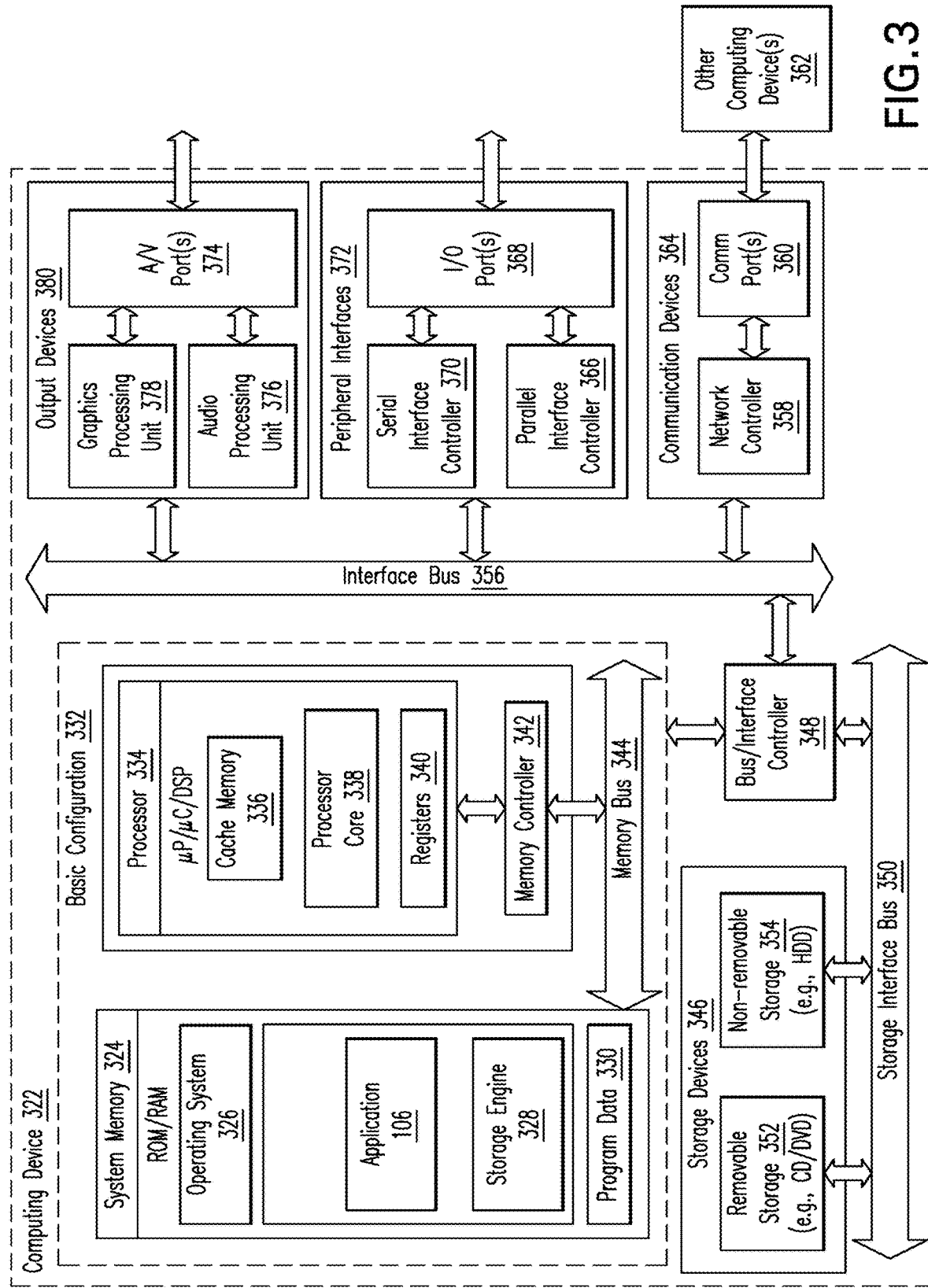
FIG. 3 depicts a block diagram of a computing device included within the system of FIG. 1, in accordance with embodiments of the present invention.

A basic configuration of a computing device is illustrated in FIG. 3 by those components within the inner dashed line. In the basic configuration of the computing device 336, the computing device 336 includes a processor 334 and a system memory 332. The terms "processor" and "central processing unit" or "CPU" are used interchangeably herein. In some examples, the computing device 336 may include one or more processors and the system memory 332. A memory bus 312 is used for communicating between the one or more processors 334 and the system memory 332.

Referring back to FIG. 3, depending on the desired configuration, the processor 334 may be of any type, including, but not limited to, a microprocessor (µP), a microcontroller (µC), and a digital signal processor (DSP), or any combination thereof. In examples, the microprocessor may be AMD's ATHLON, DURON and/or OPTERON; ARM's application, embedded and secure processors; IBM and/or MOTOROLA's DRAGONBALL and POWERPC; IBM's and SONY's Cell processor; INTEL'S CELERON, CORE (2) DUO, ITANIUM, PENTIUM, XEON, and/or XSCALE; and/or the like processor(s).

Further, the processor 334 may include one more levels of caching, such as a level cache memory 326, a processor core 324, and registers 322, among other examples. The processor core 324 may include an arithmetic logic unit (ALU), a floating point unit (FPU), and/or a digital signal processing core (DSP Core), or any combination thereof. A memory controller 318 may be used with the processor 334, or, in some implementations, the memory controller 318 may be an internal part of the memory controller 318.

Depending on the desired configuration, the system memory 332 may be of any type, including, but not limited to, volatile memory (such as RAM), and/or non-volatile memory (such as ROM, flash memory, etc.), or any combination thereof. The system memory 332 includes an operating system 330, one or more engines, such as an engine 320, and program data 314. In some embodiments, the engine 320 may be an application, a software program, a service, or a software platform, as described infra. The system memory 332 may also include a storage engine 316 that may store any information of data disclosed herein.

The operating system 330 may be a highly fault tolerant, scalable, and secure system such as: APPLE MACINTOSH OS X (Server); AT&T PLAN 9; BE OS; UNIX and UNIX-like system distributions (such as AT&T's UNIX; BERKLEY SOFTWARE DISTRIBUTION (BSD) variations such as FREEBSD, NETBSD, OPENBSD, and/or the like; Linux distributions such as RED HAT, UBUNTU, and/or the like); and/or the like operating systems. However, more limited and/or less secure operating systems also may be employed such as APPLE MACINTOSH OS, IBM OS/2, MICROSOFT DOS, MICROSOFT WINDOWS 2000/2003/3.1/95/98/CE/MILLENNIUM/NT/VISTA/XP (Server), PALM OS, and/or the like. The operating system 330 may be one specifically optimized to be run on a mobile computing device (e.g., one configuration for device 220 FIG. 1A), such as IOS, ANDROID, WINDOWS Phone, TIZEN, SYMBIAN, and/or the like.

As explained supra, the GUI may provide a baseline and means of accessing and displaying information graphically to users. The GUI may include APPLE MACINTOSH Operating System's AQUA, IBM's OS/2, Microsoft's WINDOWS 2000/2003/3.1/95/98/CE/MILLENNIUM/NT/XP/Vista/7 (i.e., AERO), UNIX'S X-Windows (e.g., which may include additional UNIX graphic interface libraries and layers such as K DESKTOP ENVIRONMENT (KDE), MYTHTV and GNU Network Object Model Environment (GNOME)), web interface libraries (e.g., ActiveX, AJAX, (D) HTML, FLASH, JAVA, JAVASCRIPT, etc. interface libraries such as, but not limited to, DOJO, JQUERY (UI), MOOTOOLS, PROTOTYPE, SCRIPT.ACULO.US, SWFOBJECT, or YAHOO! User Interface, any of which may be used.

Additionally, a web browser component (not shown) is a stored program component that is executed by the CPU. The web browser may be a conventional hypertext viewing application such as MICROSOFT INTERNET EXPLORER, EDGE, CHROME, FIREFOX, or NETSCAPE NAVIGATOR. SECURE WEB browsing may be supplied with 128 bit (or greater) encryption by way of HTTPS, SSL, and/or the like. Web browsers allowing for the execution of program components through facilities such as ACTIVEX, AJAX, (D) HTML, FLASH, JAVA, JAVASCRIPT, web browser plug-in APIs (e.g., FIREFOX, SAFARI Plug-in, and/or the like APIs), and/or the like. Web browsers and like information access tools may be integrated into PDAs, cellular telephones, and/or other mobile devices.

A web browser may communicate to and/or with other components in a component collection, including itself, and/or facilities of the like. Most frequently, the web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a web browser and an information server, a combined application may be developed to perform similar functions of both. The combined application would similarly affect the obtaining and the provision of information to users, user agents, and/or the like from the enabled nodes of the present invention.

Moreover, the computing device 336 may have additional features or functionality, and additional interfaces to facilitate communications between the basic configuration and any desired devices and interfaces. For example, a bus/interface controller is used to facilitate communications between the basic configuration and data storage devices via a storage interface bus 302. The data storage devices may be one or more removable storage devices, one or more non-removable storage devices, or a combination thereof. Examples of the one or more removable storage devices and the one or more non-removable storage devices include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus facilitates communication from various interface devices (e.g., one or more output devices 338, one or more peripheral interfaces 346, and one or more communication devices 354) to the basic configuration via the bus/interface controller 310. Some of the one or more output devices 338 include a graphics processing unit 340 and an audio processing unit 344, which are configured to communicate to various external devices, such as a display or speakers, via one or more A/V ports 342.

The one or more peripheral interfaces 346 may include a serial interface controller 350 or a parallel interface controller 352, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 348.

Further, the one or more communication devices 354 may include a network controller 356, which is arranged to facilitate communication with one or more other computing devices 360 over a network 202 communication link via one or more communication ports 358. The one or more other computing devices 360 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 332, the one or more removable storage devices 304, and the one or more non-removable storage devices 306 are examples of the computer-readable storage media. The computer-readable storage media is a tangible device that can retain and store instructions (e.g., program code) for use by an instruction execution device (e.g., the computing device 336). Any such, computer storage media is part of the computing device 336.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 334 of a general purpose computer, special purpose computer, or other programmable data processing apparatus (e.g., the computing device 336) to produce a machine, such that the instructions, which execute via the processor 334 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 336), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:
   at least one processor;
   one or more computer-readable hardware storage devices storing computer readable code comprising:
   a knowledgebase comprising proprietary, non-public financial planning and analysis information for an entity, which is at least one of a company and organization, wherein the proprietary, non-public financial planning and analysis information is maintained in a plurality of different data sources comprising a plurality of data structures including at least one relational database management system (RDBMS) structure and at least one multidimensional database having a cube structure; and
   a chatbot interface configured to simulate human conversation input through a natural language input section of the chatbot interface and a chatbot response section,
   wherein execution of the computer-readable code is configured to be executed by the processor causing the system to;
   perform natural language (NL) understanding functions on inputs of the natural language input section;
   determine a user inquiry of the knowledgebase based on results of the NL understanding functions;
   determine the data sources and types of data structures to be accessed to resolve the user inquiry;
   when it is determined that one of the data sources is an RDBMS structure, convert at least a portion of the user inquiry into a structure based query (SQL) query and execute the SQL query against determined one of the data sources to produce a first responsive table;
   when it is determined that one of the data source is a multidimensional database having a cube structure, convert at least a portion of the user inquiry into a multidimensional query comprising parameters and dimensional variables and execute the multidimensional query against a determined one of the data sources to produce a second responsive table; and
   present a result table in the chatbot response section, wherein the result table is at least one of the first responsive table, the second responsive table, and a combination of the first and second responsive tables.

2. The system of claim 1, wherein it is determined that the data source to be accessed to resolve the user query is an RDBMS database, wherein the first responsive table is the result table.

3. The system of claim 1, wherein it is determined that the data source to be accessed to resolve the user query is a multidimensional database, wherein the second responsive table is the result table.

4. The system of claim 1, wherein it is determined that relevant information for answering the user inquiry is contained in the RDMBS database and in the multidimensional database, wherein the combination of the first and second responsive tables is the result table.

5. The system of claim 1, said chatbot interface comprises a plurality of user selectable actions to be performed against the result table, said user selectable actions comprising at least one of:
   generating a spreadsheet file from the result table;
   generating a presentation slideshow file from the result table;
   generating a visualization comprising a chart from the result table; and
   generating an audit from the result table, wherein the audit presents at least one of the SQL query, the multidimensional query used to generate the result table from the knowledgebase.

6. The system of claim 5, wherein the user selectable actions are selectable via a menu popup that appears upon right clicking on the result table as presented in the chatbot response section.

7. The system of claim 5, wherein said user selectable actions comprise:
   generating the spreadsheet file from the result table.

8. The system of claim 5, wherein said user selectable actions comprise:
   generating the presentation slideshow file from the result table.

9. The system of claim 8, wherein the user is prompted via a menu to select a presentation template and a quantity of slides for the presentation slideshow file.

10. The system of claim 8, wherein the user is prompted whether AI generated content based on results of the knowledgebase is to be included in the presentation slideshow file.

11. The system of claim 5, wherein said user selectable actions comprise: generating the visualization comprising a chart from the result table.

12. The system of claim 11, wherein the user is prompted to select among a plurality of chart types for the visualization.

13. The system of claim 5, wherein said user selectable actions comprise:
   generating the audit from the result table.

14. The system of claim 1, wherein the multidimensional database is Oracle Enterprise Performance Management or a related multidimensional database such as ONESTREAM or ADAPTIVE PLANNING.

15. The system of claim 1, wherein the RDBMS is ORACLE DATABASE, MYSQL, MARIADB, POSTGRESDB, MICROSOFT SQL SERVER, or another RDBMS technology.

16. The system of claim 1, wherein the different data sources result from use of more than one commercial-off-the-shelf integrated applications used by the entity to store and maintain the proprietary, non-public financial planning and analysis information.

17. A method comprising:
   performing natural language (NL) understanding functions on inputs of the natural language input section of a chatbot interface;
   determining a user inquiry of a knowledgebase based on results of the NL understanding functions;
   determining a set of data sources and types of data structures to be accessed to resolve the user inquiry, wherein the data sources and types of data structures are part of the knowledgebase,
   when it is determined that one of the data sources is a relational database management systems (RDBMS) structure, converting at least a portion of the user inquiry into a structure based query (SQL) query and execute the SQL query against determined one of the data sources to produce a first responsive table;

when it is determined that one of the data source is a multidimensional database having a cube structure, converting at least a portion of the user inquiry into a multidimensional query comprising parameters and dimensional variables and execute the multidimensional query against a determined one of the data sources to produce a second responsive table;

wherein the knowledgebase further comprises:
- a plurality of multidimensional database applications, each associated with one or more cubes;
- specified dimensions for each application and default values for each dimension in each cube;
- default values configured to be used in forming multidimensional queries when a user inquiry does not specify a valid member from each dimension;
- hierarchies of dimension members and their associations to respective cubes;
- mappings between dimension members and cubes;
- mappings of source systems to target systems for applications requiring data loads; and
- data transformation rules for use in automated reconciliation of data between source and target systems;

automatically using default dimension values and mappings from the knowledgebase to complete multidimensional queries when incomplete input is detected:

simulating human conversation input through a natural language input section of the chatbot interface and a chatbot response section; and presenting a result table in the chatbot response section, wherein the result table is at least one of the first responsive table, the second responsive table, and a combination of the first and second responsive tables.

18. The method of claim 17, said chatbot interface comprises a plurality of user selectable actions to be performed against the result table, said user selectable actions comprising at least one of:
- generating a spreadsheet file from the result table;
- generating a presentation slideshow file from the result table;
- generating a visualization comprising a chart from the result table; and
- generating an audit from the result table, wherein the audit presents at least one of the SQL query, the multidimensional query used to generate the result table from the knowledgebase.

19. The method of claim 17, wherein the user selectable actions are selectable via a menu popup that appears upon right clicking, or otherwise accessing via an application menu or hotkey, on the result table as presented in the chatbot response section.

20. A computer-implemented method for generating query responses using a natural language interface and a knowledgebase comprising proprietary, non-public financial planning and analysis information, the method comprising:

executing, by at least one processor, computer-readable code stored on one or more non-transitory computer-readable hardware storage devices, the code comprising instructions that cause the processor to:
- access a knowledgebase comprising proprietary, non-public financial planning and analysis information for an entity, the entity being at least one of a company or an organization, wherein the proprietary, non-public financial planning and analysis information is maintained in a plurality of different data sources comprising a plurality of data structures, including at least one relational database management system (RDBMS) structure and at least one multidimensional database having a cube structure;
- receive a natural language input through a chatbot interface, the chatbot interface comprising a natural language input section and a chatbot response section;

perform natural language understanding functions on the received input of the natural language input section to determine a user inquiry directed to the knowledgebase;

determine, based on the user inquiry, one or more data sources and corresponding data structures to be accessed;

when it is determined that one of the data sources is the RDBMS structure, convert at least a portion of the user inquiry into a structured query language (SQL) query, and execute the SQL query against the RDBMS structure to produce a first responsive table;

when it is determined that one of the data sources is the multidimensional database having the cube structure, convert at least a portion of the user inquiry into a multidimensional query comprising parameters and dimensional variables, and execute the multidimensional query against the multidimensional database to produce a second responsive table; and present a result table in the chatbot response section, wherein the result table comprises at least one of the first responsive table, the second responsive table, or a combination thereof.

* * * * *